Aug. 11, 1964 HISASHI KANEKO 3,144,515

SYNCHRONIZATION SYSTEM IN TIME-DIVISION CODE TRANSMISSION

Filed March 27, 1961 3 Sheets-Sheet 1

Inventor

H. KANEKO

By [signature]

Attorney

SYNCHRONIZATION SYSTEM IN TIME-DIVISION CODE TRANSMISSION

Filed March 27, 1961 3 Sheets-Sheet 2

Inventor
H. Kaneko
By [signature]
Attorney

SYNCHRONIZATION SYSTEM IN TIME-DIVISION CODE TRANSMISSION

Filed March 27, 1961 3 Sheets-Sheet 3

Inventor
H. Kaneko
By [signature]
Attorney

United States Patent Office 3,144,515 Patented Aug. 11, 1964

3,144,515

SYNCHRONIZATION SYSTEM IN TIME-DIVISION CODE TRANSMISSION

Hisashi Kaneko, Minato-ku, Tokyo, Japan, assignor to Nippon Electric Company Limited, Tokyo, Japan, a corporation of Japan Filed Mar. 27, 1961, Ser. No. 98,503
Claims priority, application Japan Apr. 7, 1960
3 Claims. (Cl. 179—15)

The present invention relates to the frame synchronizing system in the time-division multiplex code transmission and in particular, to a system for enhancing synchronization stability of the digital synchronizing system.

In multiplex pulse code modulation (hereinafter abbreviated as PCM) or multiplex digital information transmission, frame synchronization is required for the positioning of a pulse sequence between the sending and receiving stations. In general, the start-stop system (for example, refer to FIG. 3 on page 38, Bell System Technical Journal, January issue, 1960) is used, in which a plurality of synchronizing pulses are disposed at the beginning of a frame so as to decide the starting point of the frame by detecting these pulses. When a loss of synchronism occurs it is restored via a process of hunting (phase shift) which is resorted to only when an error is observed by monitoring the collapse.

This monitoring and hunting is described in two ways: One is the semi-analog system in which an on-off pulse is used for each frame, for example, and the on-off pulse component is selected by a narrow-band filter, rectified, and monitored so that the hunting circuit may be operated by the magnitude of the monitored voltage (refer to page 62, Bell Laboratories Record, February issue, 1949). The other system is a purely digital system in which said means are operated by purely digital circuits alone. In the former case, collapse of synchronism is produced upon occurrence of the same pattern in the received signal as in the synchronizing signal sequence, whereas the latter is devoid of such a defect. Although the restoration time interval for synchronization of the latter system is shorter than that of the former system, an inherent defect of the latter is that upon detection of only one erroneous pulse in the received synchronizing signal sequence, hunting is immediately started, and during this interval, the channel is disturbed.

The object of the present invention is to provide a synchronization system, immune to noise, in which the defect of producing hunting over all the channels by only one error of a synchronizing pulse has been eliminated. This is done by causing hunting for synchronization to be performed only when a plurality of synchronizing pulses are successively erroneous, in view of the fact that the actual collapse of synchronism does not occur upon the loss of a single synchronizing pulse group.

The above-mentioned and other features and objects of this invention and the manner of attaining them will become more apparent and the invention itself will be best understood by reference to the following description of an embodiment of the invention taken in conjunction with the accompanying drawings, in which.

Figure 1:
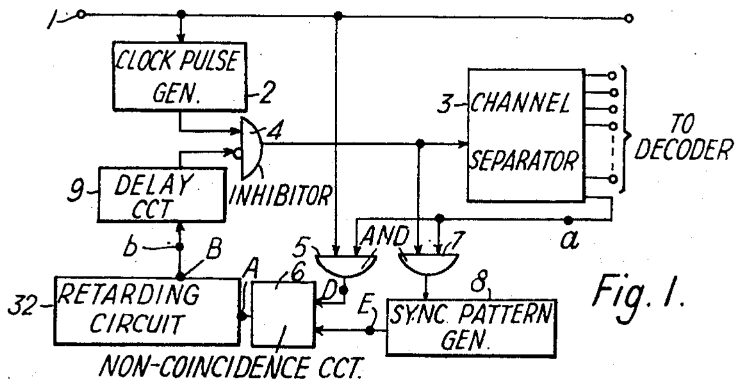
FIGS. 1 and 2 illustrate two examples of the receiving terminal station synchronizing signal separator circuits of the conventional digital synchronizing system indicating the addition of retarding circuits of this invention.
Figure 2:
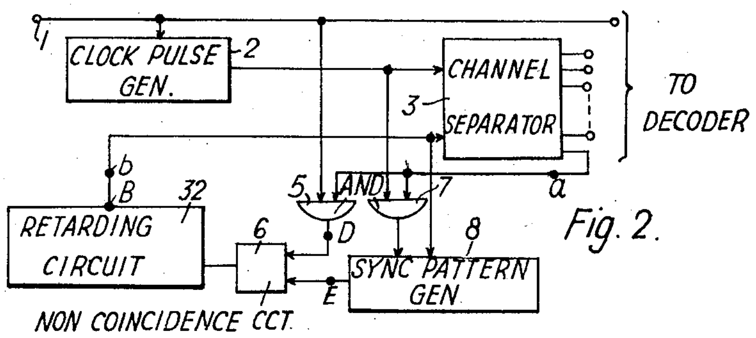

FIGS. 1 and 2 illustrate receiving terminal equipment of the digital synchronization system such as illustrated in United States applications Serial No. 50,628, filed August 19, 1960, now U.S. Patent No. 3,065,302, and Serial No. 61,933, filed October 11, 1960, now U.S. Patent No. 3,069,504, respectively. A pulse sequence containing $q$ synchronizing pulses in a frame is applied to an input terminal 1 and causes the system to be restored to synchronization automatically by causing a channel separator 3 to perform hunting when an error is found between a pattern produced by a synchronizing signal pattern generator at the receiving side with a synchronizing signal pattern that has been transmitted. Of the two hunting systems, one is a system in which one bit shift is performed each time one erroneous pulse is detected as shown in FIG. 1 and the other is a system in which the channel separator 3 is reset as shown in FIG. 2. Where the pulse arrangement is such that $q$ synchronizing pulses are grouped in one frame (sequence system), the system of FIG. 2 has superior restoration characteristics.

In FIGS. 1 and 2 the retarding circuit has been indicated as a block 32. Also, several terminal connections used in the specific examples are included, namely *a*, *b*, A, B and E.

In FIG. 1 the clock pulse frequency component is selected from the pulse sequence applied to input terminal 1 by a timing circuit or clock pulse generator 2 comprising a narrow band-pass filter. This generator advances the channel separator 3, which comprises a counter, having a capacity equivalent to the length of the frame, step by step. The communication channel outputs of the channel separator 3 are applied to the respective output terminals for connection to a decoder, not shown. The output of the synchronization channel is applied to "AND" circuits 5 and 7. At 5 the codes at the synchronizing time points are gated from the received code train, and at 7 the clock pulses are likewise gated by the synchronizing channel output to cause a synchronizing pattern generator 8 to operate.

Figure 3:
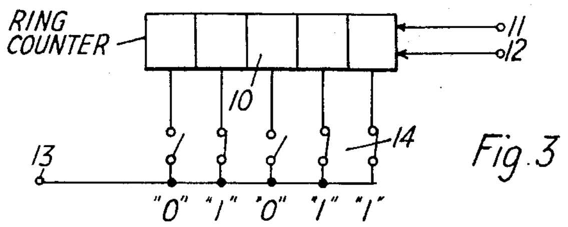
FIG. 3 illustrates a schematic block diagram of the synchronizing signal pattern generator used therefor.

The synchronizing pattern generator 8 is of the construction shown in FIG. 3. A well-known ring counter 10 is operated by the pulses given to an input terminal 11 and is advanced step by step to derive an output at each digit through a manually settable pattern-composition switch group 14 so as to produce a code such as, for example, (11010) at an output terminal 13. A more complete description is given in previously mentioned U.S. application Serial No. 50,628. It will be evident from the construction and operation of this circuit that it may be included in the channel separator circuit 3.

The block 6 is a well-known non-coincidence circuit, or what is called an "Exclusive OR" circuit that compares the output of the "AND" circuit 5 with that of the pattern generator 8 so as to produce pulses upon detection of an error, causing the clock pulses to be inhibited by the inhibitor circuit 4, via a one-bit delay circuit 9, and the channel separator 3 to shift one bit. Repetition of this process continues until restoration of synchronization is accomplished. Block 32 indicates the inventive additions to the system and will be described in detail later.

FIG. 2 illustrates a reset system. The circuit of FIG. 2 is similar to that of FIG. 1, but in this circuit both the channel separator 3 and the synchronizing signal pattern generator 8 are reset to their zero position in the synchronizing signal pattern, without the intervention of delay circuit 9 and inhibitor circuit 4, each time an error is detected in the non-coincidence circuit 6. Since the comparison is invariably effected from the first position of the synchronizing signal sequence each time an error is detected, the probability of not being able to detect an error at any of the positions of the $q$ synchronizing pulses and hence, of a comparison with synchronizing pulses in the subsequent frame, is decreased. Therefore, the time interval required for restoration becomes extremely short as compared with the system of FIG. 1. Again block 32 has been ignored in this description.

In either of the above cases, hunting is immediately performed when an error is detected. When an error is detected in the non-coincidence circuit 6, two alternative cases are conceivable: One is a case in which actual collapse of synchronism has occurred and the other is a case in which synchronizing code becomes erroneous because of mixed noise. If a collapse of synchronism is actually produced, synchronism ought to be restored at once by hunting. In the absence of collapse of synchronism, however, it is undesirable that the channel be disturbed by the production of hunting.

According to the system of the invention, in view of the above-mentioned point, hunting is retarded even if one error is detected. The error state is investigated with reference to the subsequent synchronizing pulse, or with reference to a number of succeeding synchronizing pulses, to judge whether the error is due to actual collapse of synchronism or simply an erroneous code or codes. Hunting is initiated only in the case of an actual collapse of synchronism as indicated by several error indications. Hence, the characteristics of non-susceptibility to noise of the synchronizing system may be improved. In case of an actual collapse of synchronism the restoration time interval is prolonged by the retarding time interval, but the time interval is of a negligible order as compared with the frequency of hunting interruptions caused by the loss of a single synchronization pulse. Hence, the anti-noise characteristics are improved to a marked extent. The hunting retardation may be performed for a frame or more as desired. In general, the probability of occurrence of erroneous codes in transmission is small. The simultaneous probability that synchronizing pulses in successive frames becomes erroneous is extremely small; errors are produced in each frame only when collapse of synchronism is produced. In this case, hunting may be inhibited for only one frame unit.

Figure 4:
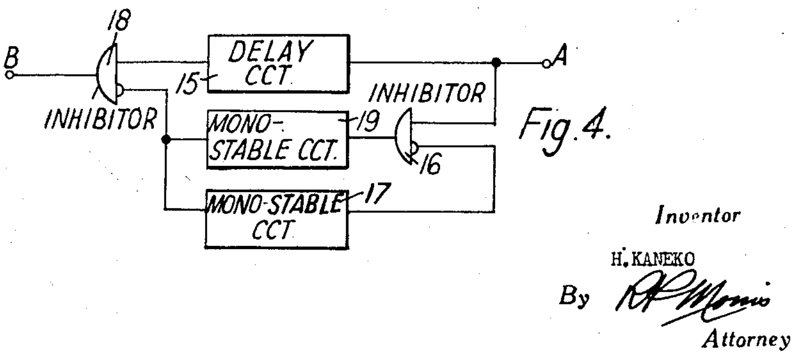
FIGS. 4 through 9 shows the construction of hunting retardation circuits in the embodiments of the system according to the present invention.
Figure 5:
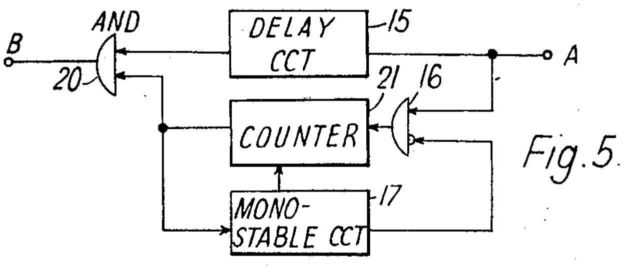
Figure 6:
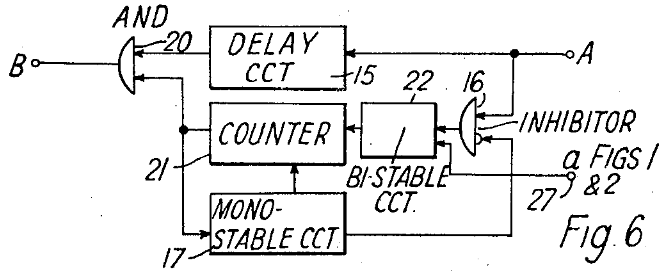
Figure 7:
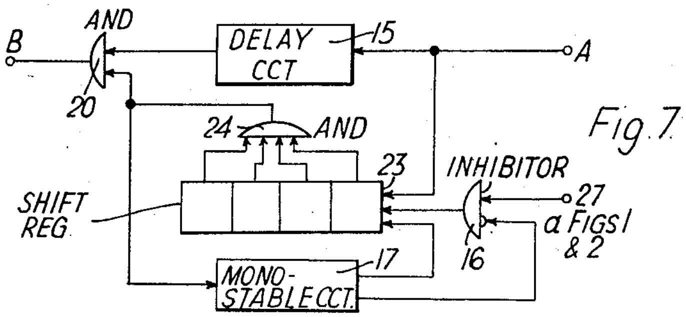
Figure 8:
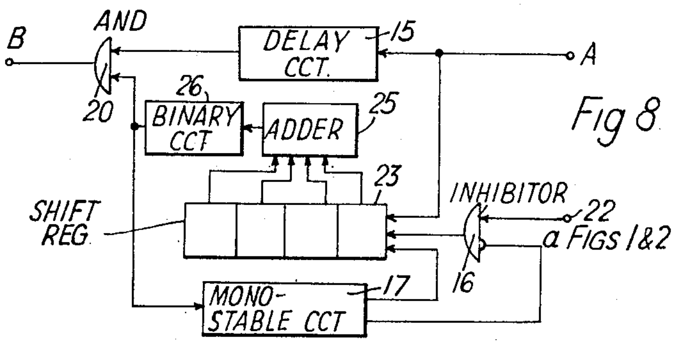
Figure 9:
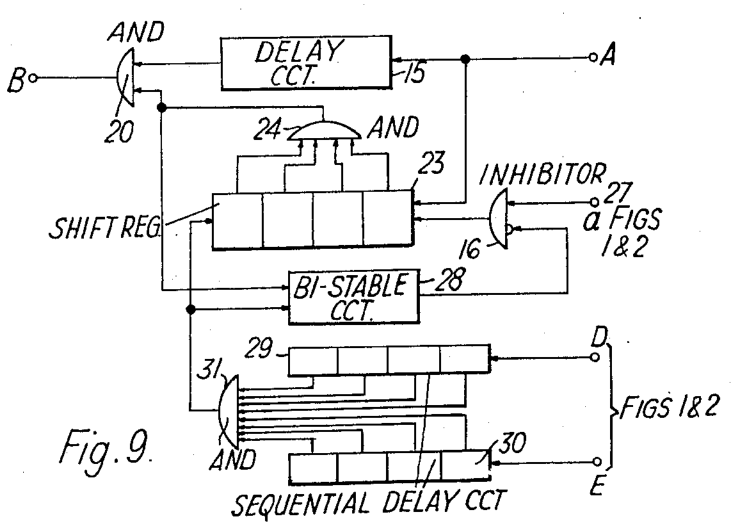

Since the output of the non-coincidence circuit 6 is a signal for performing hunting in either case, it will be evident that the retarding circuit for the hunting operation should be disposed at the position of the blocks 32 in FIGS. 1 and 2. Various methods are available for giving the retarding time. These methods are, as shown in FIG. 4, until the occurrence of an error within a suitable time interval after an error has been found in the synchronizing code group, or, as shown in FIGS. 5 and 6, until the number of errors reaches a predetermined amount after the occurrence of an error, or as shown in FIGS. 7 and 9, when a number of synchronizing code groups become erroneous in succession (or, as shown in FIG. 8, when *m* groups out of *n* synchronizing code groups become erroneous. These will be clarified with reference to each figure).

FIG. 4 shows a simple construction, wherein terminals A and B are connected to the input and output of circuit 32, respectively. The error detection pulse from the terminal A is transmitted to the terminal B via a delay circuit 15 and a known inhibitor circuit 18 to become a hunting pulse. This input pulse passes at the same time through another inhibitor circuit 16 to cause a monostable multivibrator 19 to operate. The width of the pulse generated by this multivibrator 19 is selected equal to the length of the retardation time, the hunting pulses from the delay circuit 15 being inhibited in the inhibitor circuit 18 by the output pulse from 19. The delay time of the delay circuit 15 is designed to be equal to the total delay due to the inhibitor circuit 16, multivibrator 19, and the inhibitor circuit 18, or a little longer, so that inhibiting operation of the inhibitor circuit 18 may be performed perfectly. The delay time is smaller than the clock period so it does not essentially affect the operation of the system. The output of the multivibrator 19 is applied at its leading or trailing edge, to another monostable multivibrator 17 simultaneously with application to the inhibitor circuit 18, the width of the pulse produced by the second multivibrator 17 being selected a little longer than the synchronization restoration time interval; the output preventing the entrance of triggering pulses into the multivibrator 19 at the inhibitor circuit 16. Thus, the multivibrator 19 is not triggered again and the restoration time is not delayed by the production of inhibiting pulses. Therefore, the pulse width of multivibrator 17 is selected a little longer than the expected restoration time for synchronization. For an error occurring while the pulse of multivibrator 17 is being produced, hunting takes place at once, since the probability of the occurrence of errors, other than actual collapse of synchronism, twice in succession is extremely small. Hence, an occurrence of the hunting phenomenon is highly improbable with the occurrence of a simple error.

Figure 10:
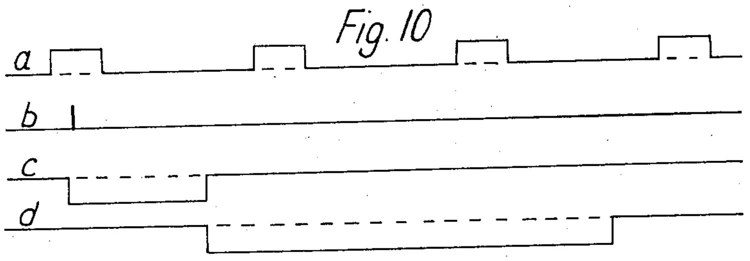
FIGS. 10 and 11 illustrate the waveforms for explaining the system according to the present invention.
Figure 11:
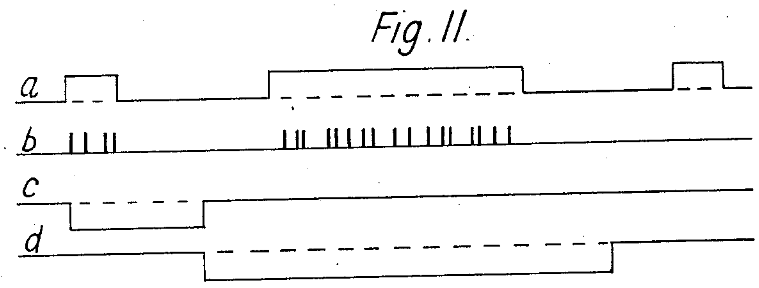

FIGS. 10 and 11 show pulse patterns for the operation of the circuit of FIG. 4. Referring to these figures, curves *a* and *b* denote pulse patterns at points *a* and *b* in FIG. 1 or 2, respectively, while *c* and *d* denote pulse patterns from 19 and 17 in FIG. 4. FIG. 10 shows the case of single synchronization error; the error detection pulse *b* being inhibited by *c* in this case and hence, no hunting is produced. FIG. 11 shows a case of actual collapse of synchronism, wherein the multivibrator 19 operates to produce *c* by the first pulse of *b*. Now let the width of pulse of the multivibrator 19 be selected a little smaller than one frame, then the retention or retardation time is one frame interval permitting error detection pulses to pass through the inhibitor circuit 18 at synchronizing time points in the subsequent frame. During this time interval, the multivibrator 17 produces *d* and serves the function of preventing the operation of the multivibrator 19. It will be evident that the multivibrator 17 may be operated not only at the trailing edge, but also at the leading edge of the output of multivibrator 19.

FIG. 5 is a modification of circuit 32, in which "AND" circuit 20 is closed until the number of error signals reaches a certain value. In other words, error detection pulses cause a known counter 21 to advance step by step via the inhibiting circuit 16 and to cause in turn the hunting pulses to pass from delay circuit 15 through the "AND" circuit 20 to output terminal B, upon counting reaching a predetermined value. The mono-stable multivibrator 17 has the same function as that of FIG. 4 and operates by the output pulses from the counter 21, so that its output pulse may inhibit error detection pulses at the inhibitor circuit 16. Therefore, during an interval in which the multivibrator 17 operates, the counter 21 maintains its value. Upon termination of the pulse from the multivibrator 17, the counter 21 is reset by the trailing edge of the pulse to be prepared for the next error.

The operation of this circuit produces hunting once for several errors if a simple error is added up. To remove this adding phenomenon, it is only necessary to reset the counter 21 for each prescribed time interval. This operation can be easily provided by known circuit techniques.

FIG. 6 is a representation in frame units of FIG. 5. Referring to FIG. 11, the error produced in a synchronizing signal sequence of one frame may not be a single pulse. Therefore, a frame in which errors have occurred may be counted as one error provided that a bistable multivibrator is used. The error detection pulses that have passed the inhibitor circuit 16 cause such a multivibrator 22 to turn "ON". It will be evident from the operation of known bistable multivibrators that thereafter the same state is held even if a number of pulses are introduced until the multivibrator is turned "OFF".

To the other terminal of the bistable multivibrator 22, a trailing-edge pulse in a synchronizing pulse sequence is applied (trailing-edge pulse from point *a* in FIG. 1 or 2, for example), whereby the multivibrator 22 is reset for every frame. Therefore, the multivibrator 22 is turned from "ON" to "OFF" only when erroneous pulses are introduced through the inhibitor circuit 16. Since the development of a pulse of the converted waveform indicates at least one error in the frame, it is only necessary that the error is counted in the same manner as in FIG. 5. In the case of the frame unit, the elimination of mishunting can be performed sufficiently without a long retention time interval provided that the number of pulses *q* in the synchronizing pulse sequence is large.

FIG. 7 will produce hunting only when all the synchronizing signals of a number of frames are erroneous. The error detection pulses entering into circuit 32 from terminal A are stored in shift register 23. The shift register 23 consists of several bistable multivibrators, such as 22 in FIG. 6, connected in cascade; the storage information being shifted in succession by the shift pulses applied to the shift register 23. The trailing pulse edge in a synchronizing signal sequence at point *a* in FIG. 1 or 2 may be used as a shift pulse in the same manner as in the case of the bistable multivibrator 22 in FIG. 6 to check errors in a frame unit. If an *n* stage shift register 23 of cascade connection is used, the condition of occurrence of errors at the synchronizing time points is stored in the shift register for the entire *n* frames. If all the information stored in the *n*-stage shift register 23 is erroneous, collapse of synchronism is evident. In such a case, the outputs of each stage of the shift register 23 is taken out by a coincidence circuit 24 to cause the hunting pulses from the delay 15 to be passed through the "AND" circuit 20 so as to perform hunting. At the same time, the shift pulses are inhibited at the inhibitor 16 by the output pulses from the multivibrator 17 as has been mentioned previously to prevent the shifting of the shift register 23 in the course of hunting. After the termination of hunting, the shift register 23 is reset at the trailing edge of the pulse from the monostable vibrator 17. The coincidence circuit 24 is an "AND" circuit consisting of *n* diodes having *n* inputs. The retention time is given by the capacity of the shift register 23. The retention time corresponding to *n* frames in this particular case.

FIG. 8 shows a case in which the condition for the judgment of synchronization collapse is somewhat different than in FIG. 7. With FIG. 8, the occurrence of errors in excess of *m* frames out of *n* frames (where *n* is greater than *m*) is judged as a collapse of synchronism. Although the circuit of FIG. 8 is almost the same as that of FIG. 7, the essential difference is that an adder circuit 25 and a binary decision circuit 26 are used in lieu of the "AND" gate 24 of FIG. 7. The adder circuit 25 is a simple resistance adder network the construction of which is known, by which the voltages stored in the shift register 23 are added up. The binary decision circuit 26 is a kind of bistable multivibrator commonly referred to as the Shmitt circuit. When the voltage from the adder circuit 25 reaches a prescribed value, the circuit is turned "ON"; upon a decrease from said value the circuit is turned "OFF". Therefore, by adjusting the operating point of the decision circuit 26 at a level corresponding to *m* frames, hunting is provided when the number of errors in each frame stored in the shift register 23 becomes greater than *m*.

In the circuits so far described, the monostable multivibrator 17 had to be adjusted longer than the restoration time for synchronization. To eliminate this redundancy, the all-digital circuit as shown in FIG. 9 may be resorted to. The operation of this circuit is almost the same as that of FIG. 7, except that a bistable multivibrator 28 is triggered by the output of the shift register 23, and the shift pulses to the shift register 23 are inhibited in the inhibitor circuit 16. On the other hand, the outputs from terminals D and E (FIGS. 1 and 2) are applied bit after bit to known *q*-stage sequential filters 29 and 30 (see for example the explanation to FIG. 5 on page 281 of "Communication Theory" by W. Jackson). Both the filters 29 and 30 consist of *q* sets of delay circuits and the code conversion circuits corresponding to a synchronizing code pattern, all outputs coinciding with one another only when the same pattern as the synchronizing signal pattern appears at each output terminal of the filters 29 and 30. A synchronizing signal sequence selected from a transmission sequence enters the filter 29 while a sync signal sequence of the output of the pattern generator 8 enters the filter 30. If both coincide with each other, synchronization has been restored perfectly. By deriving the "AND" of the outputs of each stage of the filters 29 and 30 by an "AND" circuit 31, the bistable multivibrator 28 is turned "OFF" and the shift register 23 is reset by the output of "AND" circuit 31. The circuit consisting of 28, 29, 30 and 31 is applicable to any circuit construction of FIG. 4 through FIG. 8.

Although various embodiments have been described above, it will be understood that each circuit can be freely modified so as to be easily constructed by the known logical transformation methods. Although only a few examples have been given of the mechanism for effecting the retention or inhibition time (also called retardation time) and judging collapse of synchronism, it will be understood that digital synchronization can be stabilized by retarding hunting, on the basis of a similar principle, during *n* synchronizing pulses, or *n* frames, or as to a suitably code-converted code series group and by causing hunting to take place only when actual collapse of synchronism is judged.

As has been mentioned in the above examples, the circuit for accomplishing the system of the present invention needs only to be supplied with two monostable multivibrators and two inhibitor circuits, for example, in the circuit of FIG. 4, with the result that the synchronization restoration characteristics can be improved by adding circuits of extremely simple construction.

Although a description has been made above referring to embodiments in which the circuits to be annexed are inserted at circuit 32 in FIG. 1 or 2, it is also possible to obtain the functions of the present invention based on the same principle by incorporating known logical transformation means into the entire circuitry.

As has been mentioned above, the system according to the present invention intends to stabilize the synchronization facilities to a marked extent by retarding hunting for a suitable time interval even if an error signal is produced, by checking the occurrence of errors at synchronizing time points during this time interval, and then by causing hunting to take place only when the status of occurrence of error is judged to be a collapse of synchronism. This eliminates a defect that has been inherent with the conventional digital synchronization in which hunting was produced in the case of a single error in the synchronizing pulse code sequence itself. Although the restoration time interval is prolonged by the retardation time one frame is ordinarily sufficient for restoring synchronization. Even if an actual collapse of synchronism occurs, the overall stability for synchronization is markedly improved. The system according to the present invention has wide application in such fields such as multiplex code transmission, PCM, multiplex teleprinter system, facsimile, electronic computers, digital memory devices, etc.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. In a time-division multiplex pulse code receiver in which a loss of synchronism is restored in response to error pulses obtained from the lack of coincidence between the synchronizing code selected from within a frame of received pulses and a locally generated pulse code sequence corresponding to the transmitted synchronizing code, by causing the receiver channel separator to hunt for the correct synchronizing code, the improvement therein, to retard hunting, comprising: means for delaying said error pulses; and means coupled to said delay means at the input and output thereof and responsive to the first error pulse for preventing at least said first error pulse from causing said channel separator to start hunting, said means responsive to said first error pulse comprising an AND-gate connected to the output of said delaying means, a counter controlled by the error pulses and connected on a predetermined stage thereof to said AND-gate for the preparatory opening thereof upon a predetermined number of error pulses, an inhibitor gate interposed between the source of error pulses and said counter, and an inhibiting pulse source responsive to the state of said predetermined stage of said counter for applying an inhibiting pulse to said inhibitor gate for a predetermined time.

2. In a time-division multiplex pulse code receiver in which a loss of synchronism is restored in response to error pulses obtained from the lack of coincidence between the synchronizing code selected from within a frame of received pulses and a locally generated pulse code sequence corresponding to the transmitted synchronizing code, by causing the receiver channel separator to hunt for the correct synchronizing code, the improvement therein, to retard hunting, comprising:

A. means for delaying said error pulses; and

B. means coupled to said delay means at the input and output thereof and responsive to the first error pulse for preventing at least said first error pulse from causing said channel separator to start hunting, said means responsive to said first error pulse including:

(1) an AND-gate connected to the output of said delay means; and (2) gate-control means controlled by the error pulses, connected to said AND-gate to control the opening thereof, said gate control means comprising:

(*a*) means for applying a second signal to said AND-gate, (*b*) second signal delay means responsive to error pulses for delaying the application of said second signal for a predetermined time, said second signal delay means including:

(i) a multiple stage shift register;

(ii) means for applying the error pulses to said shift register;

(iii) means for applying to said shift register shift pulses corresponding in time to the pulse sequence position of the channel separator; and (iv) means for applying the output from predetermined stages of said shift register to said AND-gate, (3) means for inhibiting said second signal delay means for a preselected time after said predetermined delay of said second signal, said inhibiting means being responsive to said output from said predetermined stages of the shift registers for inhibiting the application of said shift pulses to said shift register.

3. A receiver according to claim 2, wherein said inhibiting means includes a bistable circuit operated by said output from said predetermined shift register stages to produce an inhibiting control voltage, and further comprises means responsive to coincidence of said synchronizing code and said locally generated code to reset said bistable circuit to a non-inhibiting condition.

References Cited in the file of this patent

UNITED STATES PATENTS 2,949,503 Andrews et al. ---------- Aug. 16, 1960